United States Patent
Bidart et al.

(10) Patent No.: US 11,373,291 B2
(45) Date of Patent: Jun. 28, 2022

(54) COMBUSTION CHAMBER MODULE FOR AN AIRCRAFT TURBINE ENGINE COMPRISING MARKS FACILITATING IDENTIFICATION DURING ENDOSCOPIC INSPECTION OF THE COMBUSTION CHAMBER

(71) Applicant: SAFRAN AIRCRAFT ENGINES, Paris (FR)

(72) Inventors: Olivier Baptiste Bidart, Moissy-Cramayel (FR); Galadriel Dancie, Moissy-Cramayel (FR); Brice Marie Yves Emile Le Pannerer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 225 days.

(21) Appl. No.: 16/640,542

(22) PCT Filed: Aug. 17, 2018

(86) PCT No.: PCT/FR2018/052071
§ 371 (c)(1),
(2) Date: Feb. 20, 2020

(87) PCT Pub. No.: WO2019/038496
PCT Pub. Date: Feb. 28, 2019

(65) Prior Publication Data
US 2020/0219244 A1 Jul. 9, 2020

(30) Foreign Application Priority Data
Aug. 21, 2017 (FR) ...................................... 1757771

(51) Int. Cl.
*G06T 7/00* (2017.01)
*F04C 28/28* (2006.01)
(Continued)

(52) U.S. Cl.
CPC .............. *G06T 7/001* (2013.01); *F04C 28/28* (2013.01); *F23M 5/00* (2013.01); *G06T 11/60* (2013.01);
(Continued)

(58) Field of Classification Search
CPC . F04C 28/28; F23M 5/00; F23R 2900/00019; F23R 3/02; G06T 11/60;
(Continued)

(56) References Cited

U.S. PATENT DOCUMENTS

2012/0312103 A1 12/2012 Hannott et al.
2015/0086334 A1 3/2015 Jactat et al.

FOREIGN PATENT DOCUMENTS

EP 1001222 A2 5/2000

OTHER PUBLICATIONS

Search Report issued in French Patent Application No. 1757771 dated Mar. 22, 2018.
(Continued)

*Primary Examiner* — Manuchehr Rahmjoo
(74) *Attorney, Agent, or Firm* — Pearne & Gordon LLP

(57) ABSTRACT

The invention relates to a combustion chamber module for an aircraft turbine engine, comprising a combustion chamber defined by an internal annular wall and an external annular wall provided with air intake openings, the module further comprising an internal housing and an external housing. According to the invention, at least one of the internal and external housings has, on the surface thereof facing the combustion chamber, a marking system comprising a plurality of different marks angularly spaced apart from each other, each mark being produced facing one of the air intake openings in order to be visible from inside the
(Continued)

combustion chamber and each indicating the angular position of a zone of the combustion chamber comprising the air intake opening.

9 Claims, 3 Drawing Sheets

(51) Int. Cl.
   *F23M 5/00* (2006.01)
   *G06T 11/60* (2006.01)
(52) U.S. Cl.
   CPC ............... *G06T 2207/10068* (2013.01); *G06T 2207/30164* (2013.01)
(58) Field of Classification Search
   CPC . G06T 2207/10068; G06T 2207/30164; G06T 7/001
   See application file for complete search history.

(56) References Cited

OTHER PUBLICATIONS

International Search Report issued in Application No. PCT/FR2018/052071 dated Oct. 24, 2018.
Written Opinion issued in Application No. PCT/FR2018/052071 dated Oct. 24, 2018.

COMBUSTION CHAMBER MODULE FOR AN AIRCRAFT TURBINE ENGINE COMPRISING MARKS FACILITATING IDENTIFICATION DURING ENDOSCOPIC INSPECTION OF THE COMBUSTION CHAMBER

This is the National Stage of PCT international application PCT/FR2018/052071, filed on Aug. 17, 2018 entitled "COMBUSTION CHAMBER MODULE FOR AN AIRCRAFT TURBINE ENGINE COMPRISING MARKS FACILITATING IDENTIFICATION DURING ENDOSCOPIC INSPECTION OF THE COMBUSTION CHAMBER", which claims the priority of French Patent Application No. 17 57771 filed Aug. 21, 2017, both of which are incorporated herein by reference in their entirety.

TECHNICAL FIELD

The present invention relates to the field of aircraft turbine engines, and in particular to that of combustion chambers as well as to that of the methods for endoscopic inspection of these chambers.

PRIOR ART

During a method for endoscopic inspection of a combustion chamber, it can turn out to be difficult to know the exact position of the endoscope, namely during the recording of an image. This leads to introducing doubts on the actual position of the damage identified during the inspection, and reproduced in an endoscopic report. These doubts can make this report unusable.

DESCRIPTION OF THE INVENTION

To overcome the above problem relative to the realisations of the prior art, the object of the invention is first of all a combustion chamber module for an aircraft turbine engine, comprising a combustion chamber defined by an inner annular wall and an outer annular wall provided with air inlet orifices, said module also comprising an inner casing as well as an outer casing between which the inner and outer annular walls are arranged.

According to the invention, at least one of the inner and outer casings has, on its surface facing the combustion chamber, a marking system comprising a plurality of different marks angularly spaced apart from each other, each mark being made facing one of the air inlet orifices in order to be visible from the inside of the combustion chamber, and each informing on the angular position of a zone of the combustion chamber comprising said air inlet orifice.

The invention is thus remarkable in that it takes advantages of the air inlet orifices usually made in combustion chambers, by assigning them a new function of visual access to marks wisely positioned on the casing(s) surrounding the combustion chamber. These marks thus become easily visible from the inside of the chamber, while being made outside of this chamber, at a distance from the sensitive attack zones.

Thus, during a method for endoscopic inspection, the marks are visible and allow the operators to know the exact position of the damage identified inside the chamber. The endoscopic reports can thus report these marks, thus making them more reliable and better usable. This solution also allows to form a durable marking system, usable not only by the manufacturer during the creation and the checking of the chamber, but also by any third party servicing the turbine engine during the service life of the latter.

The invention also provides at least any one of the following optional technical features, taken alone or in combination.

Preferably, the marks are numbers and/or letters. However, other types of marks are possible, without going beyond the context of the invention.

The chamber is also defined by a chamber endwall provided with a plurality of fuel-injection devices in succession in the circumferential direction of the chamber, and the number of marks is identical to the number of fuel-injection devices.

The marks are made radially facing the air inlet orifices, preferably the primary orifices and/or the dilution orifices.

The object of the invention is also an aircraft turbine engine comprising such a combustion chamber module.

Finally, the object of the invention is a method for endoscopic inspection of a combustion chamber of such a combustion chamber module, comprising the following successive steps:

inserting an endoscope into the combustion chamber;
performing an indirect visual check of the combustion chamber using the endoscope; and
recording at least one image of the combustion chamber while associating with this image an angular position using at least one of the marks present on the inner and outer casing(s) of the combustion chamber module.

Preferably, said association of the mark with the image is carried out:

by making the mark visible on the recorded image, and/or
by identifying before or after the recording of the image, using the endoscope, the mark of the zone of the combustion chamber corresponding to said image.

Other advantages and features of the invention will appear in the non-limiting detailed description below.

BRIEF DESCRIPTION OF THE DRAWINGS

This description will be made with regard to the appended drawings among which.

DETAILED DESCRIPTION OF PREFERRED EMBODIMENTS

Figure 1:
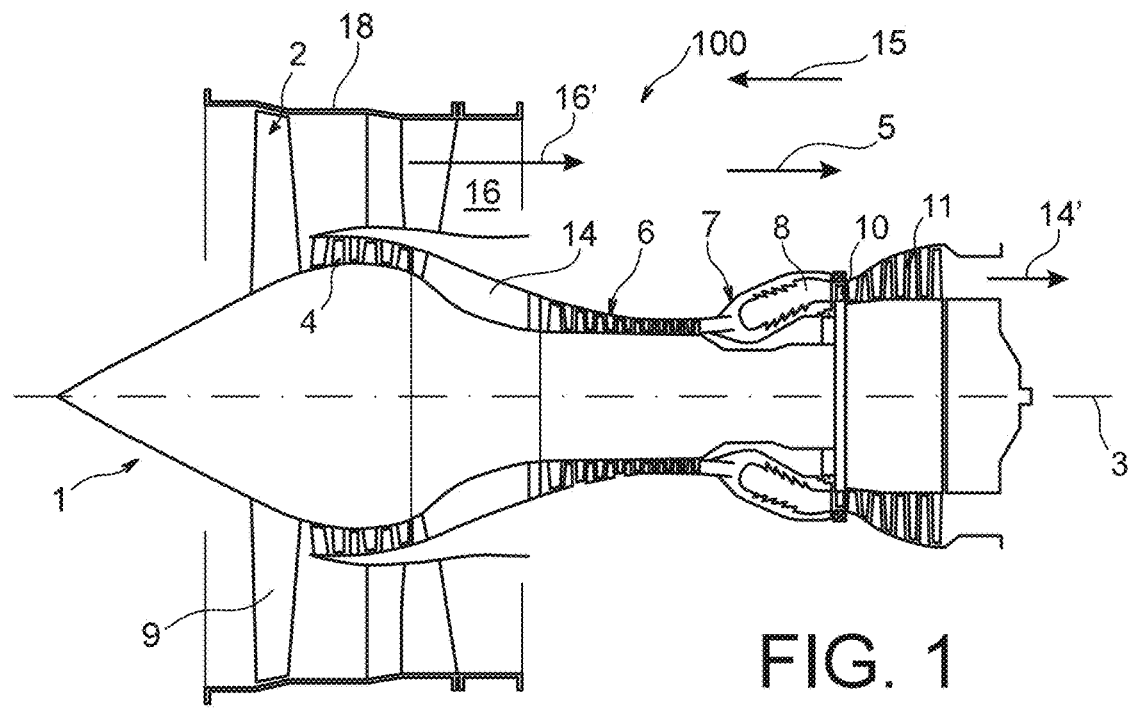
FIG. 1 shows a diagram of a turbine engine according to the invention, in a longitudinal cross-section.

In reference first of all to FIG. 1, an aircraft turbine engine 100 according to the invention is shown. Here, this is a dual flow and dual body turbojet. Nevertheless, this could be a turbine engine of another type, for example a turboprop engine, without going beyond the context of the invention.

The turbine engine 100 has a longitudinal axis 3 around which its various components extend. It comprises, from upstream to downstream in a main direction 5 of flow of the gases through this turbine engine, a fan 2, a low-pressure compressor 4, a high-pressure compressor 6, a combustion chamber 8 integrated into a combustion chamber module 7, a high-pressure turbine 10 and a low-pressure turbine 11. These elements define a primary duct 14 crossed by a primary flow 14', while a secondary duct 16 surrounds the primary duct while being partly defined by a fan casing 18 and crossed by a flow of bypass air 16'.

In the following description, the terms "front" and "rear" are considered in a direction 15 opposite to the main direction 5 of flow of the gases in the turbine engine, and parallel to the axis 3. However, the terms "upstream" and "downstream" are considered in this same main direction of flow 5.

Figure 2:
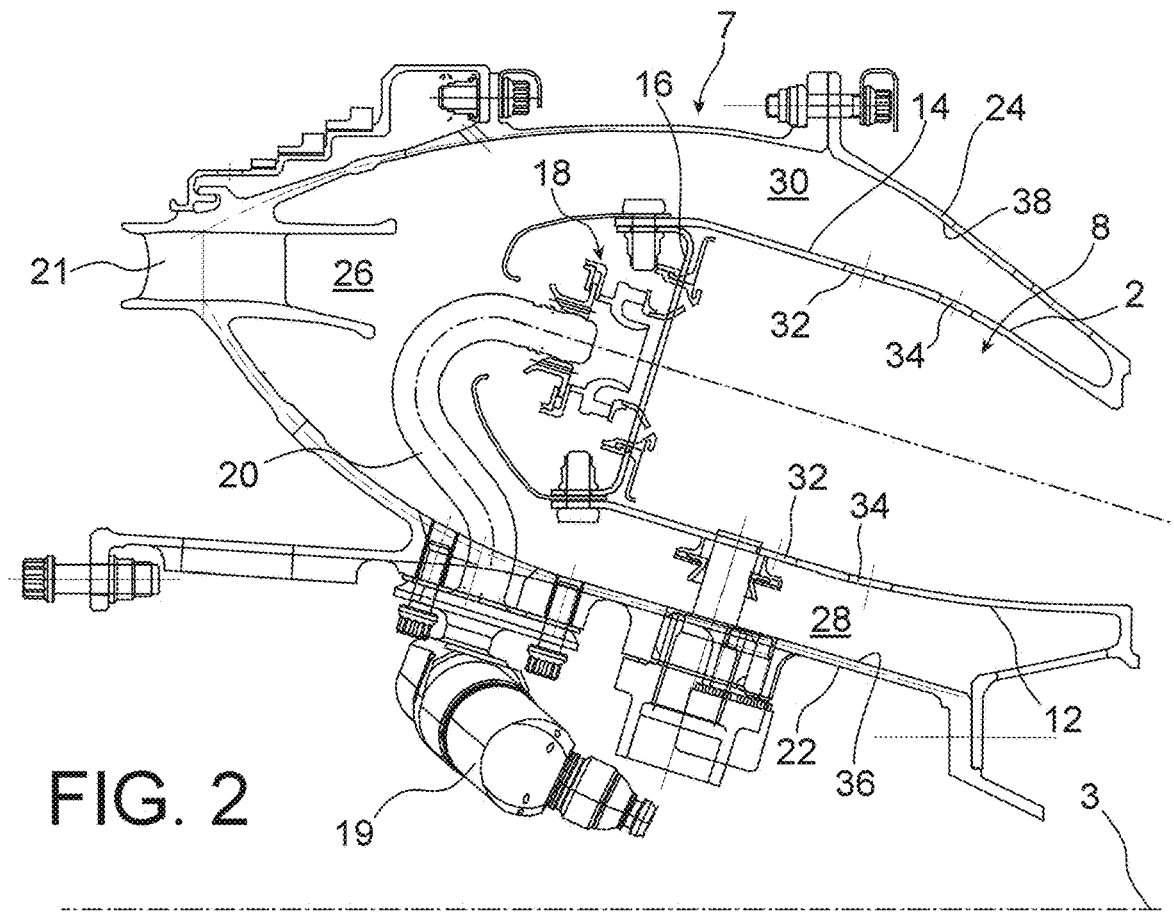
FIG. 2 shows a view of a longitudinal half-cross-section of the combustion chamber module provided in the turbine engine shown in the previous drawing.

In reference at present to FIGS. 2 to 4, the combustion chamber module 7, specific to the present invention, will be described in a more detailed manner.

It is first of all noted that the core of the module 7 is formed by the combustion chamber 8 itself, having an annular shape centred on the axis 3. This chamber is defined radially by an inner annular wall 12 and an outer annular wall 14, centred on the axis 3. At the front, it is defined by a chamber endwall 16 provided with a plurality of fuel-injection devices 18, distributed circumferentially along the endwall 16, the circumferential direction here being with respect to the longitudinal axis 3 of the turbine engine. Each injection device 18 is associated with a fuel injector 19, the valve 20 of which passes through a portion of this device, intended to ensure a mixture of air and of fuel.

The combustion chamber 8 is housed in a spaced defined upstream by a nozzle 21. The latter then splits downstream into an inner casing 22 and an outer casing 24, between which the two annular walls 12, 14 of the chamber are radially arranged. The nozzle 21 defines downstream a diffuser 26, which then splits into an inner annular space 28 for circulation of air, and into an outer annular space 30 for circulation of air.

In a known manner, the space 28 allows the inlet of air into the combustion chamber 8, via air inlet orifices provided through the inner annular wall 12. These are primary holes 32, and dilution holes 34 located further downstream. The same applies to the space 30, which allows the inlet of air into the combustion chamber 8, via primary holes 32 and dilution holes 34 provided through the outer annular wall 14.

One of the particularities of the invention lies in the presence of a marking system on at least one of the two casings 22, 24. In this respect, it is noted that the marking system that will be described below is associated with the inner annular wall 12 of the chamber, by being made on an outer surface 36 of the inner casing 22. Alternatively or simultaneously, another identical or similar marking system could be associated with the outer annular wall 14 of the chamber, by being made on an inner surface 38 of the outer casing 24.

Figure 3:
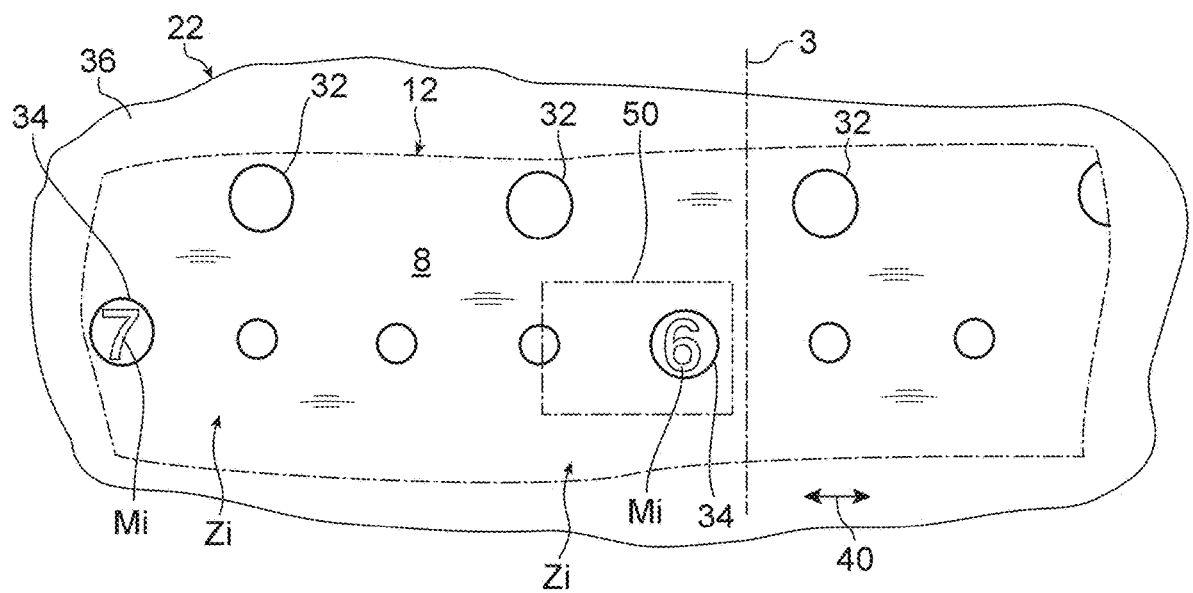
FIG. 3 is a view taken radially from the inside of the combustion chamber of the module of the previous drawing.
Figure 4:
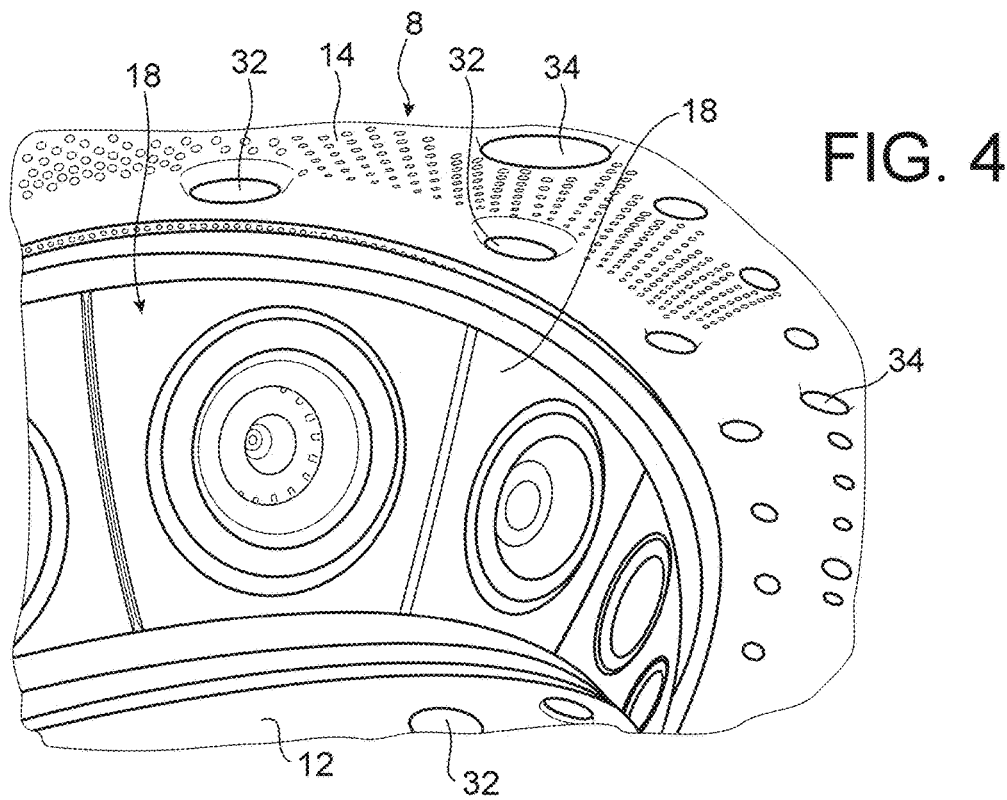
FIG. 4 is another view taken from the inside of the chamber, in the direction of the chamber endwall.

As is better visible in FIG. 3 taken radially towards the inside from the inside of the chamber 8, the marking system comprising a plurality of different marks $M_i$ angularly spaced apart from each other, in the circumferential direction 40. In this FIG. 3, two marks $M_i$ are visible, in the form of the numbers "6" and "7" shown in thicker lines than those of the numerical references associated with the elements of the invention. These numbers $M_i$ thus form marks or points of reference, by being made for example via etching on the outer surface 36 of the inner casing 22. Here, they are each made radially facing one of the dilution orifices 34. Nevertheless, the primary orifices 32 could alternatively or simultaneously be used to take advantage of visual access to the marks $M_i$, without going beyond the context of the invention.

Thus, each mark $M_i$ informs on the angular position of a zone $Z_i$ of the combustion chamber comprising the dilution orifice associated with this mark $M_i$. Indeed, when an endoscope 50 is inserted into the chamber 8 for an indirect visual check of the inner annular wall 12 and/or of the chamber endwall and of its injection device 18, the endoscope can easily identify the zone $Z_i$ in question, by orienting its optical axis radially through a dilution orifice 34 to view the mark $M_i$ therein.

Thus, during a method for inspection of the chamber using the endoscope 50, the recording of at least one image of this chamber can be performed while associating with this image an angular position using at least one of the marks $M_i$ present on the outer surface 36 of the inner casing 22. This association can be carried out by making the mark $M_i$ visible on the recorded image, and/or by identifying before or after the recording of the image, using the endoscope 50, the mark $M_i$ of the zone $Z_i$ corresponding to the image. In this latter case, the mark $M_i$ is not necessarily visible in the image, but it can be specified in the endoscopic report for a better later use of this report.

Figure 5:
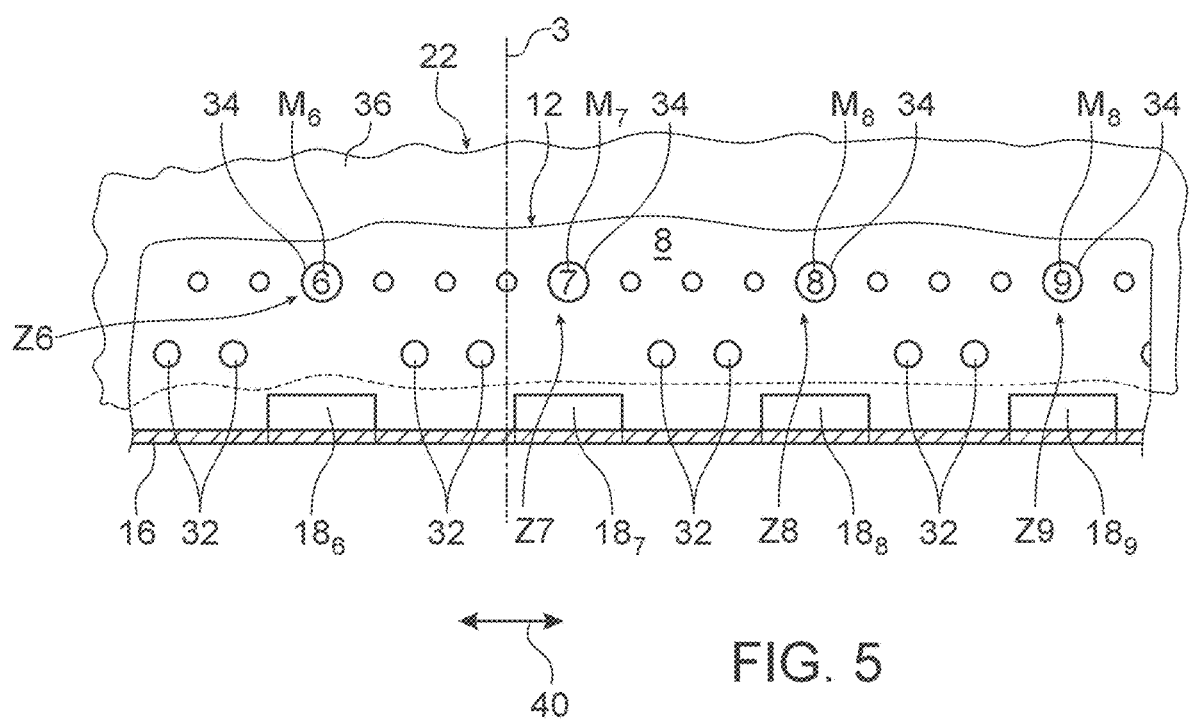
FIG. 5 is an flattened diagram of a part of the combustion chamber module shown in the previous drawings.

In the flattened view of FIG. 5, it is shown that the number of marks $M_i$ preferably corresponds to the number of injection devices. Indeed, a dilution orifice 34 is axially centred on each injection device, and the same angular point of reference is linked thereto. In other words, the sixth injection device $18_6$ is located axially in alignment with a dilution orifice 34 with which the mark $M_6$ indicating the number "6" corresponding to the zone $Z_6$ of the chamber is associated, just like the seventh injection device $18_7$ is located axially in alignment with a dilution orifice 34 with which the mark $M_7$ indicating the number "7" corresponding to the zone $Z_7$ of the chamber is associated, and so on for the marks $M_8$, $M_9$, etc.

Of course, various modifications can be made by a person skilled in the art to the invention that has just been described, only as non-limiting examples.

What is claimed is:

1. Combustion chamber module for an aircraft turbine engine, comprising a combustion chamber defined by an inner annular wall and an outer annular wall provided with air inlet orifices, said module also comprising an inner casing as well as an outer casing between which the inner and outer annular walls are arranged, wherein at least one of the inner and outer casings has, on a surface facing the combustion chamber, a marking system comprising a plurality of different marks angularly spaced apart from each other, each mark being made facing one of the air inlet orifices in order to be visible from an inside of the combustion chamber, and each informing on an angular position of a zone of the combustion chamber comprising said air inlet orifice.

2. Combustion chamber module according to claim 1, wherein the marks are numbers and/or letters.

3. Combustion chamber module according to claim 1, wherein the chamber is also defined by a chamber endwall provided with a plurality of fuel-injection devices in succession in a circumferential direction of the chamber, and in that a number of the marks is identical to a number of the fuel-injection devices.

4. Combustion chamber module according to claim 1, wherein the marks are made radially facing the air inlet orifices.

5. Combustion chamber module according to claim 4, wherein the air inlet orifices comprise primary orifices and/or dilution orifices.

6. Method for endoscopic inspection of a combustion chamber of a module according to claim 1, the method comprising the following successive steps:
   inserting an endoscope into the combustion chamber;
   performing an indirect visual check of the combustion chamber using the endoscope; and
   recording at least one image of the combustion chamber while associating with this image an angular position using at least one of the marks present on the inner and outer casing(s) of the combustion chamber module.

7. Inspection method according to claim 6, wherein said association of the mark with the image is carried out:
   by making the mark visible on the recorded image, and/or
   by identifying before or after the recording of the image, using the endoscope, the mark of the zone of the combustion chamber corresponding to said image.

8. Combustion chamber module according to claim 1, wherein the marks are arranged around the combustion chamber in a circumferential direction.

9. Aircraft turbine engine including a combustion chamber module comprising:
   a combustion chamber defined by an inner annular wall and an outer annular wall provided with air inlet orifices, said module also comprising an inner casing as well as an outer casing between which the inner and outer annular walls are arranged,
   wherein at least one of the inner and outer casings has, on a surface facing the combustion chamber, a marking system comprising a plurality of different marks angularly spaced apart from each other, each mark being made facing one of the air inlet orifices in order to be visible from the inside of the combustion chamber, and each informing on the angular position of a zone of the combustion chamber comprising said air inlet orifice.

* * * * *